C. F. GRIFFING.
ANTISLIPPING DEVICE FOR HORSESHOES.
APPLICATION FILED MAR. 20, 1911.
1,009,240.
Patented Nov. 21, 1911.
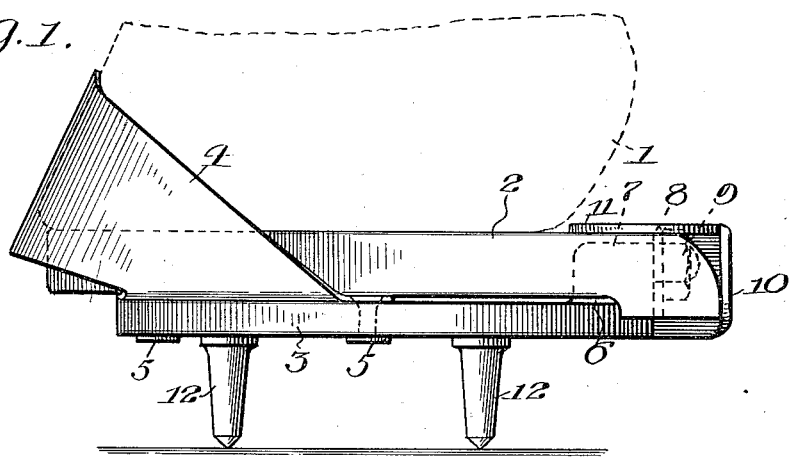
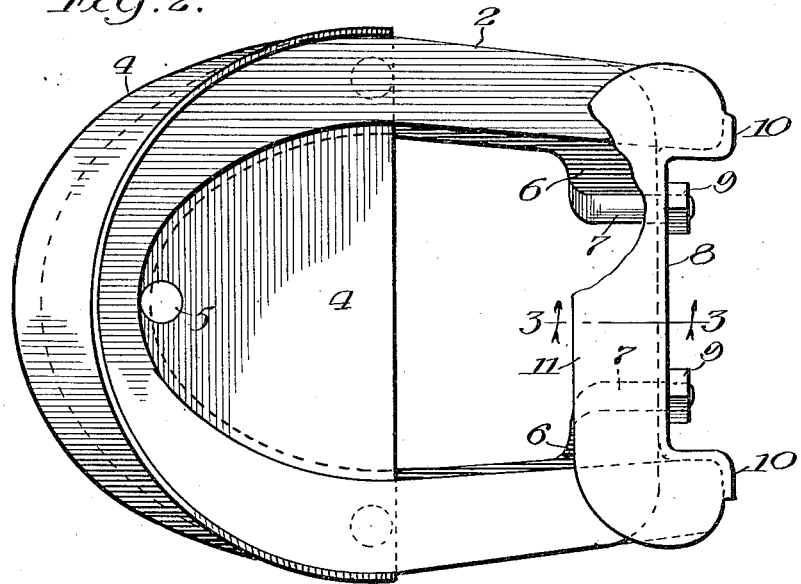
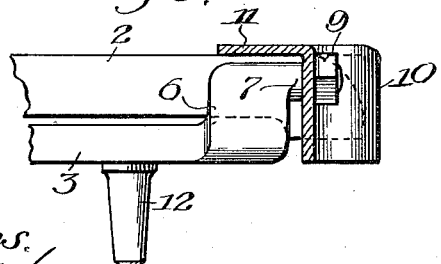
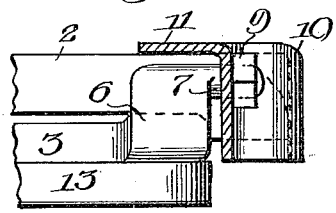
Witnesses
Inventor
Charles F. Griffing

UNITED STATES PATENT OFFICE.

CHARLES F. GRIFFING, OF CHICAGO, ILLINOIS.

ANTISLIPPING DEVICE FOR HORSESHOES.

1,009,240.  Specification of Letters Patent.  Patented Nov. 21, 1911.

Application filed March 20, 1911. Serial No. 615,496.

*To all whom it may concern:*

Be it known that I, CHARLES F. GRIFFING, a citizen of the United States, residing at Chicago, in the county of Cook and State of Illinois, have invented a certain new and useful Improvement in Antislipping Devices for Horseshoes, of which the following is a full, clear, concise, and exact description, reference being had to the accompanying drawings, forming a part of this specification.

My invention relates to anti-slipping devices for horseshoes, and the principal object is to provide a simple, practical and inexpensive form of device of this sort.

The device shown herein for carrying out the invention has a plate which is adapted to be arranged below the horseshoe, and to be applied to the shoe and horse's hoof. This plate is provided with suitable means by which the horse is prevented from slipping or sliding.

The invention contemplates an especially effective arrangement for applying the plate to the shoe and hoof.

In the accompanying drawings Figure 1 is an elevation of a horseshoe and anti-slipping device applied thereto, employing my invention, the figure showing also a part of the horse's hoof; Fig. 2 is a plan view of the device; Fig. 3 is a cross section taken on line 3—3 in Fig. 2; Fig. 4 is a view of a modified form.

Referring to the drawings I show a part of a horse's hoof 1, to which is applied a horseshoe 2, the latter being secured to the hoof in the usual way. Below the shoe 2 is a plate 3, desirably made in substantially the horseshoe shape. The plate 3 is provided with a toe clip 4, secured to the plate 3 by rivets 5—5 and extended upwardly and forwardly so as to clasp or engage the forward or toe portion of the hoof. This clasp 4 is made of sheet metal. It is made open at its lower forward portion in front of the plate 3, so as to accommodate the toe portion of the shoe 2 or the calk which might be thereon. At the rear of the plate 3 its opposite sides come somewhat toward one another and extend up between the calks at the rear of the horseshoe. These end portions 6—6 are formed into threaded bolts 7—7, which point rearwardly between the two rear sides of the horseshoe. A supplemental plate or bar 8 is arranged at the rear of the plate 3 and provided with apertures to receive the bolts 7—7, which latter pass through said bar and are provided with nuts 9—9. The plate 8 has its ends bent rearwardly and then laterally to form portions 10—10 for engaging the rear ends of the horseshoe so that when the bolts 9—9 are secured tightly into place the bar 8 draws tightly against the horseshoe and thereby clamps and screws the plate 3 firmly in position. The bar 8 is desirably provided with a horizontally extending flange portion 11, extending forwardly over the rear portion of the horseshoe.

The plate 3 may be provided with any form of anti-slipping device, as for example the pins 12—12 shown in Fig. 1, or the rubber covering 13 shown in Fig. 4.

It will be seen that the anti-slipping plate can be easily applied to the horse's hoof, even though the shoe is already on the hoof, and when so applied can be clamped firmly in place by the locking arrangement at the end of the device. At the same time it will be seen that the device is simple and can be inexpensively made.

It will be understood that changes and modifications can be made without departing from the spirit of the invention.

What I claim is:

1. A device of the class specified, comprising a plate adapted for application to the horseshoe, having substantially the shape of the horseshoe and having its rear ends formed into bolts, a toe sheath secured to said plate and adapted to extend up the front of the hoof and having an aperture in front of the plate, a cross bar at the end of said plate, fitting between the ends of said plate and engaging said bolts thereon, and nuts to engage said bar.

2. A device of the class specified, comprising a plate adapted for application to the horseshoe and having substantially the shape of the horseshoe, the rear ends of said plate being formed into bolts, a toe sheath secured to said plate and adapted to extend up the front of the hoof, a cross bar at the end of said plate, extending between the sides thereof, and having apertures to receive said bolts, said plate having bent portions at its ends to engage the ends of the horseshoe and also having a horizontally disposed portion extended over the top of the rear portion of the horseshoe, and nuts on said bolts engaging said bar.

In witness whereof, I hereunto subscribe my name this 16th day of March A. D., 1911.

CHARLES F. GRIFFING.

Witnesses:
HAZEL JONES,
A. LYDA JONES.

Copies of this patent may be obtained for five cents each, by addressing the "Commissioner of Patents, Washington, D. C."